United States Patent [19]

Fecteau

[11] 4,178,159
[45] Dec. 11, 1979

[54] CLEAN ROOM FILTER ASSEMBLY

[76] Inventor: Ronald D. Fecteau, 14203 Huff, Warren, Mich. 48091

[21] Appl. No.: 835,154

[22] Filed: Sep. 21, 1977

[51] Int. Cl.² .................................................. B01D 50/00
[52] U.S. Cl. ............................... 55/385 A; 55/473; 55/484; 55/502; 55/509; 98/40 D
[58] Field of Search ................. 55/473, 385 A, 483, 55/484, 502, DIG. 29; 98/40 D; 52/28, 475, 495

[56] References Cited

U.S. PATENT DOCUMENTS

| 1,921,230 | 8/1933 | Hunter | 52/28 |
|---|---|---|---|
| 3,552,104 | 1/1971 | Wood | 98/40 D |
| 3,808,777 | 5/1974 | Neumann et al. | 98/40 D |
| 3,870,490 | 3/1975 | Landy | 55/502 |
| 3,880,625 | 4/1975 | Shook | 55/484 |
| 3,999,471 | 12/1976 | Bishop | 55/502 |
| 4,088,463 | 5/1978 | Smith | 55/484 |

FOREIGN PATENT DOCUMENTS 2293126  7/1976  France .................................. 55/385 A Primary Examiner—Bernard Nozick
Attorney, Agent, or Firm—McGlynn and Milton

[57] ABSTRACT

A filter assembly for a clean room and a total clean room assembly incorporating the filter assembly wherein the filter assembly includes a filter housing for receiving a suitable filter unit. The filter design of the filter assembly produces a seal between the filter housing and the upper and lower edges of the filter unit to prevent unfiltered air from leaking around the filter housing into the clean room. The filter assembly is also designed to be positively clamped and sealed to a supporting framework, or lattice, in order to provide a totally sealed air delivery system for a clean room.

10 Claims, 7 Drawing Figures

CLEAN ROOM FILTER ASSEMBLY

FIELD OF THE INVENTION

This invention relates to filter assemblies of the type used in clean rooms and also to a novel clean room design.

BACKGROUND OF THE INVENTION

Clean rooms are used, for example, in pharmaceutical facilities to provide an atmosphere uncontaminated by dust, pollen, bacteria and the like for processing and packaging drugs and other pharmaceutical products. Clean rooms are also used in the food, aerospace and electronic industries as well as in hospitals to provide an uncontaminated atmosphere.

Typically, a clean room comprises a sealed enclosure to which air is supplied by an air circulating system. In order to remove airborne contaminants the air circulating system includes one or more filter assemblies which filter the air before it enters the clean room. The one or more filter assemblies are normally mounted in the ceiling or wall of the clean room or comprise a false ceiling which is suspended from the structural ceiling of the clean room. The filter assemblies to which this invention relates include a housing which is adapted to receive a suitable replaceable filter unit. The housing is connected by duct work or a plenum to a blower which forces air through the filter unit into the clean room.

Industry practice and government regulation have required increasingly stricter standards for clean room performance. It has been necessary in recent years to improve the design of clean rooms and particularly the air circulating system to improve and insure the quality of the air entering the clean room. One problem which has been difficult to overcome is that of sealing the air circulating system to prevent accidental introduction of contaminants into the clean room. For example, leaks may occur within the filter assembly which permit unfiltered air to bypass the filter unit and enter the clean room. Additionally, since many clean rooms are constructed using a number of filter assemblies, sealing problems arise between adjacent filter assemblies resulting in another source of contamination.

The instant invention provides a unique filter assembly having greatly improved sealing properties which reduce the possibility of internal leaks. The filter assembly is suitable for use in the construction of clean rooms or in the construction of controlled atmosphere bench units. The instant invention also provides a unique total clean room design incorporating a plurality of the filter assemblies which facilitates construction of the clean room and helps to prevent leaks between adjacent filter assemblies.

BRIEF SUMMARY OF THE INVENTION

The clean room filter assembly of the instant invention includes a filter housing having side walls which define a recess having dimensions which are capable of receiving a filter unit. The filter units used with the invention are of a commercially available, standard type. More specifically, the filter units include a mass of suitable filter media which is supported by a rigid frame, usually of wood or particleboard, or metal, which surrounds the sides of the filter media. The filter unit is positioned within the recess and is held in place by a retainer member which is fastened to the filter housing. The improved sealing properties of the filter assembly are achieved by providing a double seal between the filter unit and the filter housing. More specifically, a first seal is produced between the filter housing and the upper edge of the filter unit frame and a second seal is produced between the filter housing and the lower edge of the filter unit frame by providing a seal on the retainer member. The filter housing and the retainer member are drawn together by suitable means to compress the filter unit frame between the first and second seals. As a result, air in the filter housing above the filter unit cannot pass around the sides of the filter unit. This design, therefore, eliminates one major source of contamination.

A total clean room is constructed using a number of the filter assemblies by providing means for supporting the filter assemblies in the ceiling or wall of the clean room. The suspension means includes a framework, or lattice, of interconnected tee and angle members which define openings for receiving the filter assemblies. Such tee and angle members are commonly used in clean room designs; however, the filters are normally merely seated on such members. According to the instant invention the filter assemblies are positively clamped to the tee and angle members. Sealing strips are used between the tee and angle members and the filter assemblies to prevent leakage at these points. The clamping arrangement insures that the seals will not be broken by vibration or inadvertant movement of the filter assemblies. The double seals for the filters and the seals between the filter assemblies and the supporting framework insure a totally sealed air supply to the interior of the clean room.

STATEMENT OF PRIOR ART

Clean room filter assemblies including a filter housing for receiving a filter unit are shown in U.S. Pat. Nos. 3,323,437; 3,760,568 and 3,985,158. None of these patents disclose a filter assembly which provides a double seal for the filter unit. U.S. Pat. No. 3,418,915 discloses a clean room ceiling module wherein filter units are sealed along upper and lower edges; however, the filter units are not enclosed in filter housings to which air is supplied.

With respect to the clean room design, U.S. Pat. No. 3,486,311 discloses a filter bank for a clean room ceiling which employs a framework of channel members for supporting a number of filter units. This patent, however, does not disclose the positive clamping arrangement of the instant invention.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
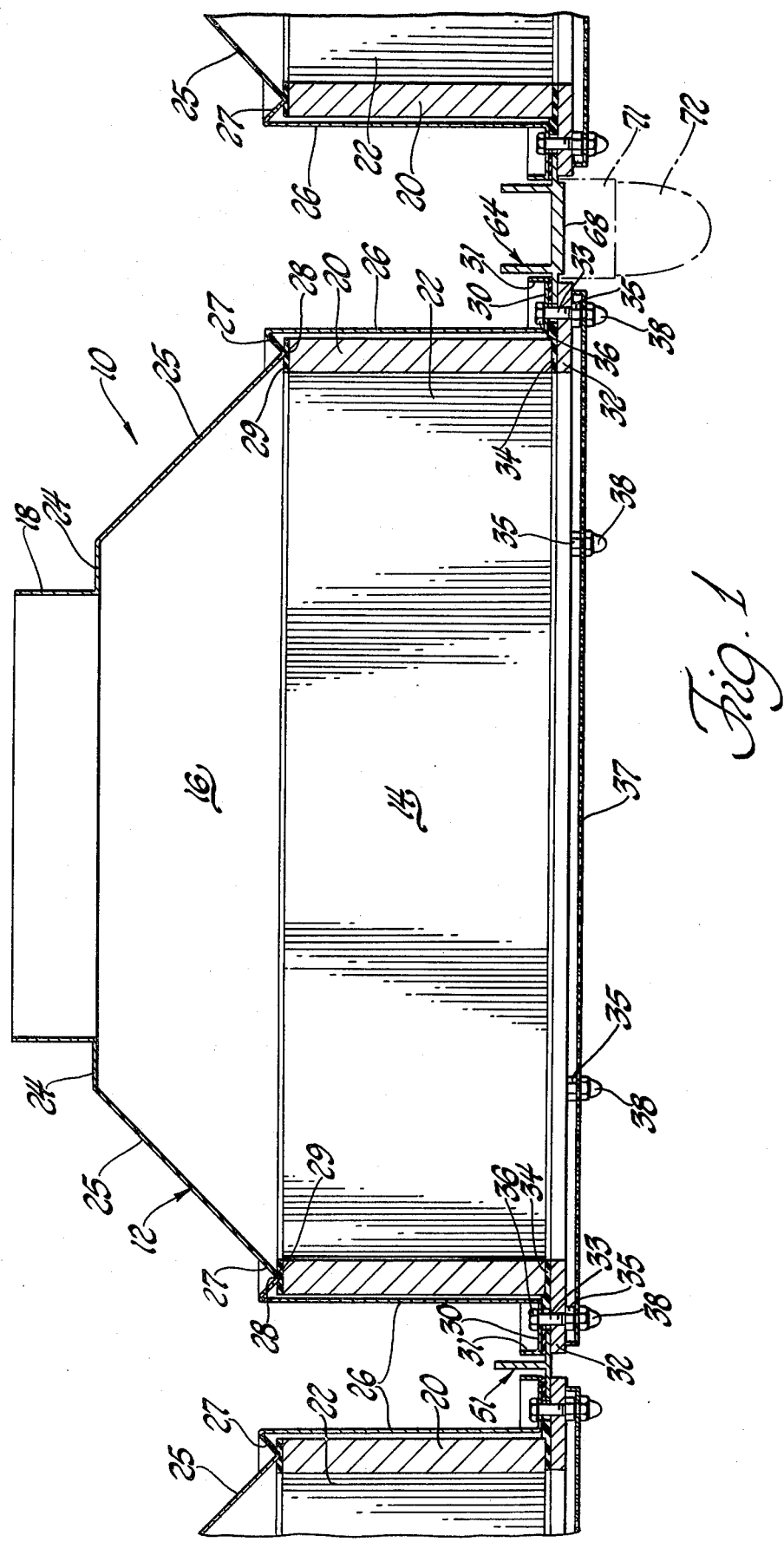
FIG. 1 is a cross-sectional, elevational view of adjacent filter assemblies constructed and assembled in accordance with the instant invention.

Referring more particularly to the drawings, a clean room filter assembly constructed in accordance with the instant invention is shown generally at 10 in FIG. 1. The filter assembly 10 comprises a part of an air circulating system for a clean room. The incorporation of the filter assembly 10 in a total clean room design will be described in greater detail herein.

The filter assembly 10 is adapted to house a filter unit which filters air supplied to the clean room. Accordingly, the filter assembly includes a filter housing 12 which encloses the sides of a filter unit 14. The filter housing 12 defines a plenum chamber 16 over the filter unit 14 for delivering air under pressure to the top surface of the filter unit 14. The lower surface of the filter unit 14 is exposed to the interior of the clean room. Air is introduced into the filter housing 12 through a stack or inlet 18 which is connected by suitable duct work to a blower, the details of which are described with reference to FIG. 6. The air flows downwardly through the plenum chamber 16 and through the filter unit 14 into the clean room.

The filter unit 14 is of standard design and does not form a part of the invention except for its interaction with structural portions of the filter housing and other components of the assembly. The filter unit 14 includes a rigid frame 20 typically made of wood, particleboard or metal which surrounds the sides of a mass of filter media 22. While different grades of filters may be used depending on the intended use of the clean room, for pharmaceutical use the required efficiency of the filter is normally greater than 99.9% for 0.3 micron diameter particles. When dealing with particles of this size, it should be apparent that very small leaks in the air circulating system can cause contamination of the clean room. The design of the filter assembly serves to prevent such leaks.

The filter housing 12 is rectangular as viewed in horizontal cross section. A convenient size for the filter housing 12 for clean rooms is 24"×48"; however, these dimensions are given merely to indicate a typical size and are not critical. The filter housing 12 can be fabricated from sheet metal, plastic or other common materials.

The stack 18 of the filter housing is circular in cross section and is connected to a top wall 24 of the filter housing 12. The top wall 24 is joined to outwardly slanting side walls 25 which are in turn joined to vertical side walls 26. The slanting side walls 25 form the plenum chamber 16 and the vertical side walls 26 form a downwardly opening recess having dimensions capable of receiving the filter unit 14.

In order to prevent air from passing around the sides 20 of the filter unit 14, provision is made for producing a seal between the filter housing 12 and the upper edge of the filter unit 14. A downwardly directed V-bend 27 is formed in the outwardly slanting wall 25 slightly inboard of the vertical side wall 26. The apex of the downwardly directed V-bend 27 forms a continuous and integral sealing edge 28 around the interior of the filter housing 12. The sealing edge 28 is positioned so that it aligns with the upper edge of the filter unit 14. As shown, the sealing edge 28 aligns with the upper edge of the filter frame 20. A layer of suitable sealing material 29 is applied to the upper edge of the frame 20. The sealing material 29 may comprise an adhesive-backed rubber strip which adheres to the filter frame 20. As will be described more thoroughly herein, the sealing material 28 is forced against the sealing edge 29 so that the sealing edge 29 embeds itself into the sealing material 29 to form an exceptionally dependable seal.

Returning to the description of the filter housing 12, the side walls 26 include a flange 30 which extends outwardly from the lower edge of the side walls 26. The filter housing flange 30 is stiffened by an up-turned lip 31. This configuration is shown most clearly in FIGS. 2-5. As will be described, the filter housing flange 30 is used to help retain the filter unit 14 in place and is also used to support the filter assembly 10 on a supporting framework.

In order to hold the filter unit 14 in the filter housing 12 a retainer member 32 is used. The retainer member 32 comprises a rectangular frame having internal dimensions corresponding generally to the internal dimensions of the filter frame 20 so that the inner edge of the retainer member 32 overlaps the filter frame 20. The outer dimensions of the retainer member 32 are such that its outer edge overlaps the filter housing flange 30. Suitable fasteners are employed to connect the retainer member 32 to the filter housing flange 30. For example, nut and bolt fasteners 33 may be used.

Provision is made for producing a seal between the retainer member 32 and the lower edge of the filter frame 20. Specifically, a layer of sealing material 34 is applied to the inner edge of the retainer member 32 so that it overlaps the lower edge of the filter frame 20 and the lower edge of the side walls 26 of the filter housing. The sealing material 34 may comprise an adhesive-backed rubber strip.

It is noted that the lower edge of the filter frame 20 extends slightly below the lower edge of the filter housing side walls 26. The filter housing is designed so that the distance between the sealing edge 28 and the lower end of the side walls 26 is made approximately equal to the height of the filter frame 20. Since the sealing strip 29 is approximately ¼" thick, the lower edge of the filter frame 20 extends slightly beyond the end of the side walls 26. The height of the filter frame 20 is, therefore, slightly greater than the distance between the sealing edge 28 and the lower end of the side wall 26.

When the retainer member 32 is tightened into place by screwing nuts 35 onto the bolts 36, the filter unit 14 is forced upwardly so that the sealing edge 28 is forced against the sealing material 29. Additionally, the sealing material 34 on the retainer member 32 is compressed between the retainer member 32 and the lower edge of the filter frame 20. The strip of sealing material 34 is wide enough to overlap the filter housing flange 30 so that the sealing material 34 is forced against the lower edge of the side wall 26 when the retainer member 32 is tightened into place. This creates a seal between the side walls 26 of the filter housing 12 and the lower edge of the filter unit 14. This configuration produces a double seal between the filter housing 12 and the filter unit 14 which is very effective in preventing unfiltered air from passing around the sides of the filter unit 14 into the clean room.

A protective grille 37 is attached to the retainer member 32 to protect the exposed lower surface of the filter unit 14 from damage. The protective grille is attached to the retainer member 32 by cap nuts 38 screwed onto the ends of the bolts 36 which extend through the grille 37.

Another feature of the filter assembly is that the filter unit 14 can be easily replaced. This is accomplished by removing the grille 37 and then dropping the retainer member 32 by unscrewing the nuts 35. The filter unit is then free to drop out of the filter housing 12. A new filter unit can then be installed.

In many clean room assemblies, the filter portion is not replaceable. This necessitates replacement of the entire filter assembly which adds significantly to maintenance costs. Additionally, it is often difficult to remove the filter assembly because it is connected to the air circulating duct work and is relatively inaccessible due to the manner in which it is supported. Consequently, a filter assembly which permits replacement of only the filter unit has distinct advantages over other designs.

The design of the filter assembly 10 also facilitates the construction of a total clean room. While the filter assembly 10 can be used alone for small rooms, many clean rooms require a number of filter assemblies to supply a sufficient amount of filtered air to the clean room at a reasonable velocity. As shown in FIG. 1, multiple filter assemblies can be joined together to form a filter module which can be suspended from the ceiling of a clean room. Alternatively, the filter module can be mounted in the ceiling of a clean room by joining the ceiling material to the filter housing flange 30 through a tee connection. However, when the filter module is suspended from the ceiling of a clean room it usually forms a false ceiling which covers the entire area between the walls of the clean room. This type of construction is shown in FIG. 6.

Figure 6:
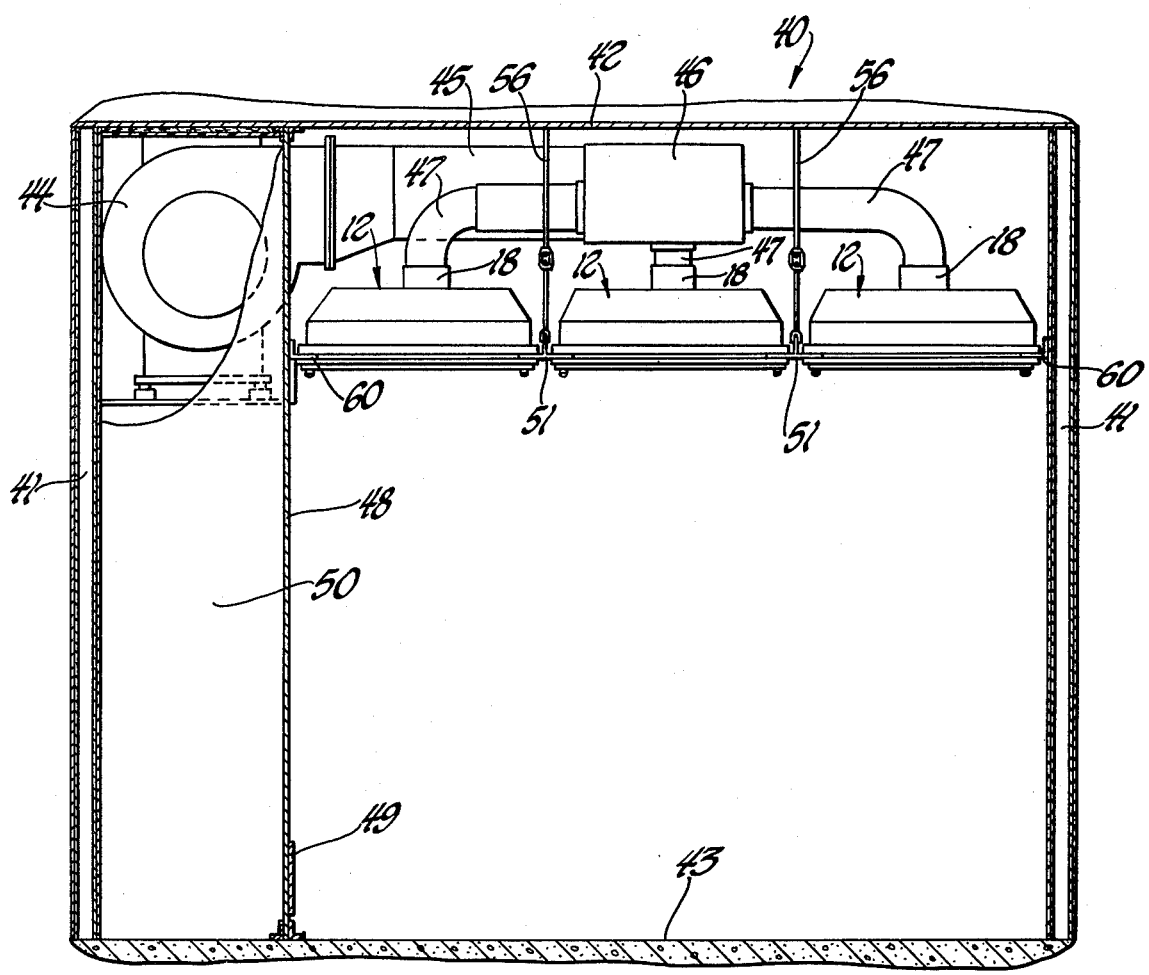
FIG. 6 is a cross-sectional, elevational view of a total clean room constructed in accordance with the instant invention

Referring to FIG. 6, a clean room is generally shown at 40. The clean room 40 generally comprises an enclosure formed by four walls 41, a ceiling 42 and a floor 43. While not shown, the enclosure also includes a door and any necessary observation windows or other accessories. The basic enclosure is made employing standard clean room construction techniques.

As shown in FIG. 6, a number of filter assemblies 10 are suspended from the ceiling 42 of the clean room by a framework, or lattice, of tee and angle members. Air is supplied to the clean room by an air circulating system which incorporates the filter assemblies 10 of the instant invention. More specifically, air is fed to filter assemblies 10 through suitable duct work from a blower 44. It is to be noted, however, that the duct work can be dispensed with and the air supplied directly to the filter units through a plenum surrounding a number of filter units. The main duct 45 from the blower 44 feeds a manifold 46 which in turn feeds branch ducts 47 to each of the filter assemblies. A partition wall 48 separates the blower 44 from the rest of the clean room.

Air entering the clean room through the filter assemblies 10 flows downwardly toward the floor 43 and returns to the blower 44 through one or more vents 49 located along the bottom of the partition wall 48. The air then flows upwardly to the blower 44 in the space 50 behind the partition wall 48. This arrangement constitutes exhaust means for returning air to the blower 44 for recirculation. While not shown, the air circulating system also includes means for supplying fresh makeup air to the blower and means for conditioning the air to control temperature and humidity.

False ceilings in clean rooms have been provided with a framework of tee members, typically inverted tee members, for supporting filter units or modules. The framework of tee members define a number of openings for receiving a filter assembly. The edges of the tee members overlap the filter assemblies to provide vertical support. In order to provide a seal between the filter assemblies and the supporting framework, a layer of sealing material is usually applied to the filter assembly or to the tee members. In clean room assemblies of this type the filter assemblies are not positively connected to the tee members but are merely placed in the openings. Hence, only the weight of the filter assembly is relied upon to maintain the seal with the tee members. Slight dimensional variations or twisting of the framework will prevent sealing agreement between the filter assembly and the tee members which results in leaks. Additionally, even if a good seal is initially produced it can be lost due to vibration caused by the air passing through the filter assembly. In this regard it is noted that air is delivered through filter assemblies of this type at a velocity of between 70–110 feet per minute.

In order to avoid this problem, the clean room filter assembly provides means for positively clamping the individual filter assemblies to the tee members to insure a positive and reliable seal despite dimensional variations and vibrations. In order to illustrate, reference is made to FIG. 3 which shows a connection between two filter assemblies employing a tee member, generally indicated at 51. As is common for such members used in the framework, the tee member includes a vertical flange 52 for connecting the same to a support, e.g. the ceiling, and at least one horizontal flange. In the case of a tee member, it includes two horizontal flanges 53 and 54 because it is used to join adjacent filter assemblies.

Figure 3:
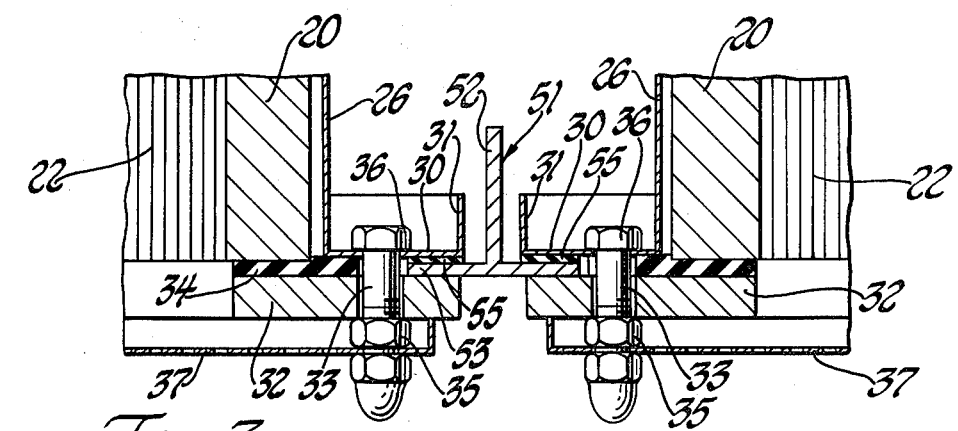
FIG. 3 is a view similar to FIG. 2 of another type of connection between two adjacent filter assemblies.

As shown in FIG. 3, the horizontal flanges 53 and 54 are clamped between the filter housing flange 30 and the retainer member 32 by the nut and bolt fasteners 33. A strip of sealing material 55 is applied to either the housing flange 30 or the horizontal flange 53, 54 of the tee member 51. When the nut 35 is tightened on the bolt 36, the sealing material 55 is compressed between the flange 30 and the tee members 51 to form a reliable seal between the filter assembly and the tee member.

Figure 7:
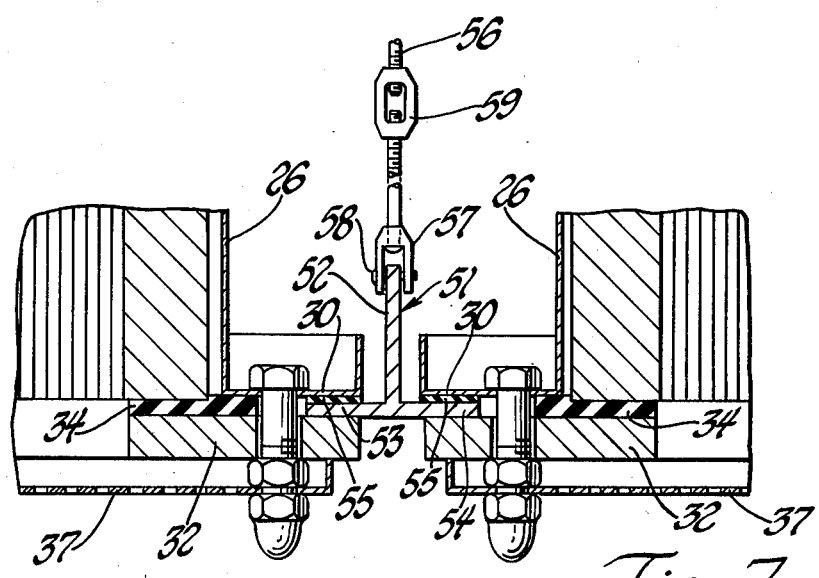
FIG. 7 is a cross-sectional, elevational view of a detail of FIG. 6.

As shown in FIGS. 6 and 7, the tee members 51 may be supported from the ceiling of the clean room by rods 56 which are anchored in the ceiling 42. The rods 56 are joined to the vertical flange 52 of the tee member by an inverted U-clamp 57 and a fastener 58. In order to provide vertical adjustment, turnbuckles 59 may be used along the length of the rods 56.

Figure 5:
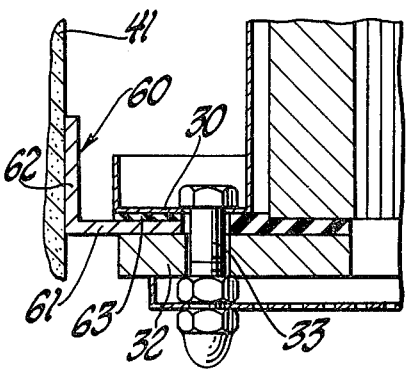
FIG. 5 is a cross-sectional, elevational view of a connection between a filter assembly and a supporting wall.

As shown in FIG. 5, where a filter assembly meets a wall of the clean room, an angle member, generally indicated at 60, may be employed as a support. The horizontal flange 61 is clamped between the retainer member 32 and the filter housing flange 30 by the nut and bolt fasteners 33. The vertical flange 62 is attached to the wall 41 of the clean room in any suitable manner. In order to produce a seal, a layer of sealing material 63 is used between the flange 30 and the retainer member 32.

Figure 2:
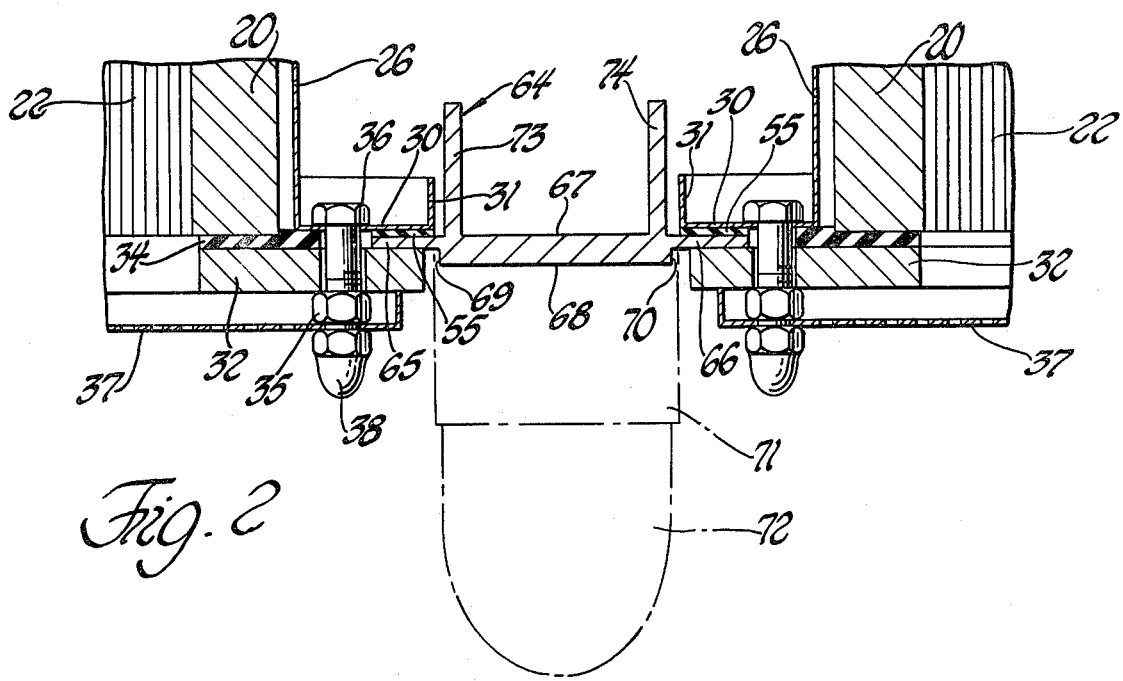
FIG. 2 is a cross-sectional, elevational view of one type of connection between two adjacent filter assemblies which is capable of supporting a light fixture.

In constructing clean rooms of the type described herein, it is necessary to make provision for lighting fixtures. As shown in FIGS. 1 and 2, a light fixture-supporting member, generally indicated at 64, can be provided by modifying the design of the tee member. More specifically, a light fixture would normally be located between adjacent filter assemblies 10; therefore, the design of a light fixture-supporting member 64 includes a pair of horizontal flanges 65 and 66. The two horizontal flanges are clamped between the retaining members 32 and the filter housing flanges 30 as described above with respect to other types of members.

The horizontal flanges 65 and 66 are separated by an intermediate section or web 67. The intermediate section 67 includes a continuous depending ridge 68 which forms opposed shoulders 69 and 70 which run the length of the member. The electrical box 71 for a lighting fixture can be easily attached to the shoulders 69 and 70 by threaded fasteners (not shown). A suitable lens 72 which forms a part of the lighting fixture can then be fastened to the electrical box 71. In order to provide vertical support for the light fixture supporting member 64, the member 64 is provided with a pair of vertical flanges 73 and 74. The vertical flanges 73 and 74 may be connected to the ceiling of the clean room in the same manner as the tee members shown in FIG. 7.

Figure 4:
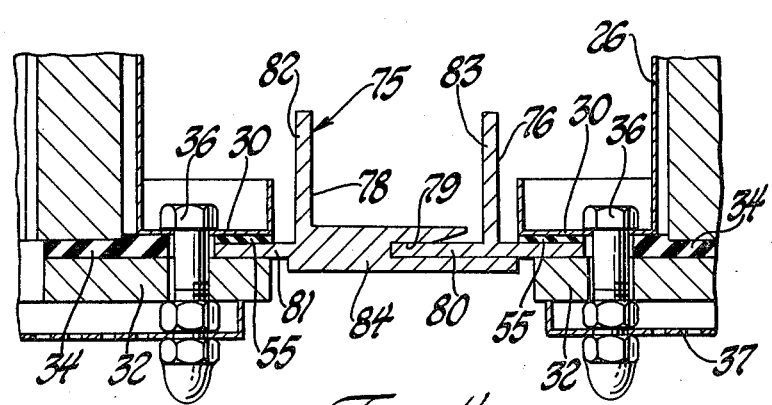
FIG. 4 is a view similar to FIG. 2 of a separable field connection between two adjacent filter assemblies.

In some clean rooms multiple filter modules may be employed. It is contemplated that the modules will be assembled as a unit with the tee members clamped in place at the manufacturing facility for subsequent installation on the job site. It is necessary, therefore, to make a field connection between adjacent modules. A connecting member which serves this function is shown in FIG. 4. The connecting member, generally indicated at 75, is separable so that one half may be clamped to one of the filter modules while the other half is clamped to the adjacent filter module. These two halves have interfitting portions which are joined on the job site to connect the two modules. More specifically, a standard tee member 76 is clamped to the right-hand filter assembly as viewed in FIG. 4. This connection is typical of the connections described with respect to other tee members. The other half 78 of the separable connecting member 75 includes a flange having a slot 79 which faces the free horizontal flange 80 of the tee member 76. As shown in FIG. 4, the slot 79 is adapted to receive the horizontal flange 80. This portion of the connecting member also includes a horizontal flange 81 which is clamped between the retainer member 32 and the filter housing flange 30 of the left-hand filter assembly. When the two halves of the connecting member are assembled, the two vertical flanges 82 and 83 are brought together. It is also noted that the assembled connecting member defines a depending continuous ridge 84 which is identical to the ridge of the light fixture-supporting member 64. Hence, it is convenient to design the clean room so that light fixtures are located at junctions between adjacent filter modules.

In summary, it is noted that a clean room having a totally sealed air circulating system can be provided by the instant invention. Specifically, the double seal arrangement of the filter assemblies prevents unfiltered air from leaking around the sides of the filter units. Moreover, the filter assemblies are sealed to their supporting framework to prevent leaks at these points. Consequently, a totally sealed clean room can be produced.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiments of the invention in which property or privilege is claimed are defined as follows:

1. A clean room assembly of the type which includes an enclosure having a ceiling, walls and a floor, a plurality of filter assemblies supported by the ceiling or wall, supply means for supplying air to said filter assemblies and exhaust means for exhausting air from said enclosure, the improvement comprising: means for supporting the filter assemblies from one of said ceiling and walls including a framework made up of interconnected tee members supported by said enclosure which define openings for receiving said filter assemblies, said tee members including a first flange for connecting the same to a support and at least one additional flange for attaching a filter assembly thereto, each filter assembly including a filter unit having a mass of filter media and a frame surrounding said filter media and a filter housing including side walls defining a recess having dimensions capable of receiving said filter unit, said side walls including an outwardly directed flange at their lower ends, a removable retainer member connected to said flange of said filter housing to receive one of said flanges of said tee members therebetween, fastening means between said retainer member and said flange of said filter housing for removably connecting said retainer member to said filter housing and for clamping said filter housing to said tee members, and said framework including a separable member having a tee member and a second portion having a slotted flange for receiving one of said flanges of said tee member.

2. A clean room assembly as set forth in claim 1 including a layer of sealing material between said flange of said filter housing and the flange of said tee member.

3. A clean room assembly as set forth in claim 1 including first sealing means for producing a seal between said filter housing and the upper edge of the filter unit and second sealing means located on said retainer member for producing a seal between said filter housing and the lower edge of the filter unit.

4. A clean room assembly as set forth in claim 3 wherein said first sealing means includes a continuous, downwardly directed sealing edge formed in the side walls of said filter housing for engaging the upper edge of the filter unit.

5. A clean room assembly as set forth in claim 4 wherein said first sealing means includes a continuous V-bend formed in said side walls of said filter housing including an apex positioned to engage the upper edge of the filter unit.

6. A clean room assembly as set forth in claim 4 including a retainer member for engaging the lower edge of the filter unit to retain the filter unit in said filter housing and fastening means for connecting said retainer member to said filter housing.

7. A clean room filter assembly comprising:
 a filter housing including walls defining a plenum chamber and a filter-receiving recess located below said plenum chamber, an inwardly-directed V-shaped bend formed at the intersection between the plenum chamber walls and the recess walls, said V-shaped bend being located inside said recess walls; a filter unit including a body of filter media, a rectangular frame surrounding said filter media, and a first layer of sealing material located on the upper peripheral edge of said filter frame; a removable retainer member for engaging the lower peripheral edge of said filter frame to retain said filter unit in said recess; a second layer of sealing material located between said retainer member and the lower peripheral edge of said filter frame which overlaps said lower peripheral edge of said filter frame and said filter housing walls; each of said recess walls of said filter housing including an outwardly directed flange at the lower edge thereof; and fastening means for detachably connecting said retainer member to said flanges of said filter housing and for forcing said retainer member against said filter unit to compress said first layer of sealing material between said V-shaped bend and the upper peripheral edge of said filter frame and to compress said second layer of sealing material between said retainer member and said lower peripheral edge of said filter frame.

8. An assembly as set forth in claim 7 wherein the effective distance between the apex of said V-bend and the lower edge of said recess walls is less than the height of the filter unit frame whereby, upon connecting said retainer member to said filter housing, the filter unit is forced into said recess to compress the filter unit between said V-bend and said retainer member.

9. An assembly as set forth in claim 7 wherein said retainer member and said horizontal flange of said filter housing are generally parallel and spaced apart to define a space therebetween for receiving a supporting member.

10. An assembly as set forth in claim 6 including a grille supported below the filter unit.

* * * * *